US011453555B2

(12) United States Patent
Lindley et al.

(10) Patent No.: US 11,453,555 B2
(45) Date of Patent: Sep. 27, 2022

(54) STORAGE AND ORDER-PICKING SYSTEM WITH A REDUCED PROCESSING TIME AND METHOD FOR OPERATING SAME

(71) Applicant: TGW Logistics Group GmbH, Marchtrenk (AT)

(72) Inventors: Timothy Lindley, Schwerte (DE); Gerald Kettlgruber, Linz (AT); Harald Johannes Schroepf, Wels (AT)

(73) Assignee: TGW Logistics Group GmbH, Marchtrenk (AT)

(*) Notice: Subject to any disclaimer, the term of this patent is extended or adjusted under 35 U.S.C. 154(b) by 158 days.

(21) Appl. No.: 17/253,217

(22) PCT Filed: Jul. 19, 2019

(86) PCT No.: PCT/AT2019/060241
§ 371 (c)(1),
(2) Date: Dec. 17, 2020

(87) PCT Pub. No.: WO2020/019009
PCT Pub. Date: Jan. 30, 2020

(65) Prior Publication Data
US 2021/0114813 A1    Apr. 22, 2021

(30) Foreign Application Priority Data

Jul. 23, 2018  (AT) .............................. A 50638/2018

(51) Int. Cl.
*B65G 1/137* (2006.01)
(52) U.S. Cl.
CPC ......... *B65G 1/1378* (2013.01); *B65G 1/1376* (2013.01); *B65G 2201/0229* (2013.01); *B65G 2209/04* (2013.01)
(58) Field of Classification Search
CPC combination set(s) only.
See application file for complete search history.

(56) References Cited

U.S. PATENT DOCUMENTS 6,580,046 B1 *  6/2003  Koini .................... B64F 1/368
                                                       700/226
7,084,769 B2 *  8/2006  Bauer ................ G06K 7/10178
                                                       340/10.3
(Continued)

FOREIGN PATENT DOCUMENTS

AT          516 612 B1    7/2016
AT          520517 A4     5/2019
(Continued)

OTHER PUBLICATIONS

International Search Report in PCT/AT2019/060203, dated Nov. 12, 2019.
(Continued)

*Primary Examiner* — Kyle O Logan
(74) *Attorney, Agent, or Firm* — Collard & Roe, P.C.

(57) ABSTRACT

A method for picking orders (22a . . . 22e) in a storage and order-picking system (1a, 1b) is provided, which comprises an article storage (2), a loading station (3), a sorting unit (4), a packing station (5), an overhead conveyor system (7a . . . 7f) and a control system (8). At the loading station (3), articles (22a . . . 22e) are transferred from a loading aid (23, 24, 25a . . . 25c) into a transport means (28a, 28b) and at the packing station (5) from a transport means (28a, 28b) into a shipping loading aid (30). In this regard, transporting an article (22a . . . 22e) out of the article storage (2) to the loading station (3) takes place individually and independently of the other picking orders for each picking order. Furthermore, transporting the transport means (28a, 28b) from the loading station (3) into the sorting unit (4) also takes place individually and independently of the other picking order and directly for each picking order. Furthermore, a storage and order-picking system (1a, 1b) for performing the method is provided.

37 Claims, 2 Drawing Sheets

(56) References Cited

U.S. PATENT DOCUMENTS

| | | | |
|---|---|---|---|
| 8,170,712 B2 * | 5/2012 | Battles | B65G 1/1371 700/216 |
| 8,538,578 B2 | 9/2013 | Battles et al. | |
| 9,014,843 B2 * | 4/2015 | Winkler | G06Q 10/087 700/216 |
| 9,421,580 B2 * | 8/2016 | Hansl | B07C 7/04 |
| 9,760,086 B2 * | 9/2017 | Woodtli | B65G 1/0492 |
| 9,975,699 B2 * | 5/2018 | Yamashita | B65G 1/1378 |
| 9,988,212 B2 * | 6/2018 | Yamashita | B65G 1/06 |
| 10,252,861 B2 * | 4/2019 | Mathi | B65G 13/02 |
| 10,354,221 B2 * | 7/2019 | Winkler | G06Q 10/087 |
| 10,710,802 B2 * | 7/2020 | Grosse | B65G 1/0414 |
| 2008/0056864 A1 * | 3/2008 | Wada | B65G 1/0457 700/28 |
| 2008/0270327 A1 * | 10/2008 | Freudelsperger | B65G 1/1376 705/500 |
| 2012/0097064 A1 * | 4/2012 | Kussner | B65G 65/00 104/29 |
| 2018/0025460 A1 * | 1/2018 | Watanabe | G06Q 50/28 705/28 |
| 2019/0177086 A1 * | 6/2019 | Mathi | B65G 1/10 |
| 2020/0024074 A1 * | 1/2020 | Herzog-Lang | B65G 47/61 |

FOREIGN PATENT DOCUMENTS

| | | |
|---|---|---|
| AU | 1998071492 A1 | 11/1998 |
| AU | 2012207033 A1 | 2/2013 |
| CA | 3 096 726 A1 | 10/2019 |
| CN | 101134528 A | 3/2008 |
| CN | 101957904 A | 1/2011 |
| CN | 103738646 A | 4/2014 |
| CN | 103764523 A | 4/2014 |
| CN | 104169197 A | 11/2014 |
| CN | 105392719 A | 3/2016 |
| CN | 105473469 A | 4/2016 |
| CN | 107408285 A | 11/2017 |
| CN | 207434315 U | 6/2018 |
| DE | 20 2009 009 774 U1 | 9/2009 |
| DE | 10 2011 104 511 B3 | 10/2012 |
| DE | 10 2011 103 194 A1 | 12/2012 |
| DE | 10 2011 106 667 A1 | 1/2013 |
| DE | 10 2011 116 081 B3 | 4/2013 |
| DE | 10 2013 101 659 A1 | 8/2013 |
| DE | 10 2013 103 869 A1 | 10/2014 |
| DE | 10 2014 111 396 A1 | 2/2016 |
| DE | 10 2014 115 579 A1 | 4/2016 |
| DE | 20 2017 106 993 U1 | 12/2017 |
| DE | 20 2017 100 206 U1 | 4/2018 |
| EP | 2 581 329 B1 | 7/2014 |
| EP | 2 769 936 A1 | 8/2014 |
| EP | 2 964 549 B1 | 9/2016 |
| EP | 2 766 285 B1 | 4/2017 |
| WO | 2006/029433 A1 | 3/2006 |
| WO | 2012/163780 A1 | 12/2012 |
| WO | 2013/004712 A1 | 1/2013 |
| WO | 2016/033628 A1 | 3/2016 |
| WO | 2017/027897 A1 | 2/2017 |
| WO | 2017/100170 A1 | 6/2017 |
| WO | 2017/190168 A1 | 11/2017 |
| WO | 2017/214652 A1 | 12/2017 |

OTHER PUBLICATIONS

International Search Report in PCT/AT2019/060241, dated Dec. 6, 2019.

International Search Report in PCT/AT2019/060204, dated Oct. 24, 2019.

International Search Report in PCT/AT2019/060202, dated Oct. 24, 2019.

Link to YouTube—Video from Knapp AG "How to shop your elephant": https://www.youtube.com/watch?v=nU9UV8z3ap0, 72 pages, downloaded Nov. 10, 2020.

SSI Carrier, The highly dynamic pocket sorter system for e-commerce and omnichannel, 10 pages, with English translation, downloaded Nov. 20, 2020.

SSI Schaefer, SSI Carrier: Das hochdynamische Taschensorter—System fuer E-Commerce und Omnichannel, https://www.youtube.com/watch?v=ASYRjuTOJ-U, 50 pages, downloaded Nov. 17, 2020.

* cited by examiner

STORAGE AND ORDER-PICKING SYSTEM WITH A REDUCED PROCESSING TIME AND METHOD FOR OPERATING SAME

CROSS REFERENCE TO RELATED APPLICATIONS

This application is the National Stage of PCT/AT2019/060241 filed on Jul. 19, 2019, which claims priority under 35 U.S.C. § 119 of Austrian Application No. A 50638/2018 filed on Jul. 23, 2018, the disclosure of which is incorporated by reference. The international application under PCT article 21(2) was not published in English.

The invention relates to a method for picking articles in a storage and order-picking system having an article storage, a loading station, a sorting unit, a packing station, an overhead conveyor system with transport means for accommodating articles and for transporting the articles in the transport means, between the loading station, the sorting unit and the packing station, and a control system. The method comprises providing articles in the article storage, wherein the articles comprise lying articles and/or hanging articles, and the registration of picking orders by means of the control system. Moreover, the method comprises retrieving articles from the article storage, in concrete terms, transporting an article out of the article storage according to a first picking order to the loading station, and transporting an article out of the article storage according to a second picking order to the loading station. Furthermore, the article(s) according to the first picking order and the article(s) according to the second picking order are each provided at the loading station, and transport means of the overhead conveyor system are also provided at the loading station. Consequently, the article(s) for the first picking order is/are transferred into one of the transport means of the overhead conveyor system, and the article(s) for the second picking order is/are transferred into one (another one) of the transport means of the overhead conveyor system. Afterwards, the transport means are transported from the loading station to the sorting unit via the overhead conveyor system. Lastly, the sorted transport means are transported from the sorting unit to the packing station.

Moreover, the invention relates to a storage and order-picking system for picking articles, in particular for carrying out the aforementioned method. The storage and order-picking system comprises an article storage for providing articles, wherein the articles comprise lying articles and/or hanging articles. The article storage additionally comprises storage places and an article transport system for transporting the articles between the storage places and the loading station. Moreover, the storage and order-picking system comprises a loading station for transferring the articles into transport means according to picking orders, a sorting unit for sorting the transport means, a packing station for transferring the articles out of the transport means and into shipping loading aids according to picking orders, an overhead conveyor system with transport means for accommodating articles and for transporting the articles in the transport means, between the loading station, the sorting unit and the packing station, and a control system, which is connected, in a data-technical manner, to the article storage, the loading station, the sorting unit, the overhead conveyor system and the packing station, and is configured for registering picking orders. Moreover, the control system is configured for controlling the article transport system for retrieving the articles from the article storage, wherein retrieving an article comprises transporting an article out of the article storage and to the loading station according to a first picking order and transporting an article out of the article storage and to the loading station according to a second picking order.

In this context, EP 2 581 329 B1 discloses a system for picking orders with at least one article assigned to an order, and/or for a returns management. The system comprises an overhead conveyor system with trolleys, feed places, a batch buffer as well as multiple conveying paths and packing places. According to the proposed method, all trolleys with the articles of an order are retrieved from the batch buffer and fed to a packing place as soon as all articles of the order are completely stored in the batch buffer and/or the order is qualified for being called forward.

This approach entails a series of disadvantages.

In the method proposed in EP 2 581 329 B1, it is necessary for multiple orders to be able to be buffered in the batch buffer. For this reason alone, the batch buffer must be configured to be comparatively large. The remaining facilities in the article storage system of EP 2 581 329 B1, for example sorting facilities, have to be configured to be relatively large, as they need to accommodate the total number of articles of multiple orders for processing the conveying stream. Additionally, the dwell time of the articles of an order in the batch buffer is comparatively long, which leads to the order-picking operation also taking up a lot of time.

Moreover, in the method proposed in EP 2 581 329 B1, dependencies between the individual orders to be handled in a batch occur. The complexity resulting therefrom leads to technically challenging control tasks and especially to comparatively long processing times and/or run-through times through the storage and order-picking system. This means that the time between acceptance of an order and delivery of the articles is comparatively long.

Therefore, one object of the invention is to provide an improved method and an improved article storage system for picking articles. In particular, the disadvantages mentioned above are to be overcome.

The object of the invention is achieved by a method of the initially mentioned type, in which retrieving articles from the article storage takes place individually and independently of other picking orders for each picking order, for each picking order, the transport of the transport means from the loading station into the sorting unit via the overhead conveyor system takes place individually and independently of the other picking orders and directly, and the sorting of the transport means in the sorting unit takes place according to the picking orders.

The object of the invention is further achieved by a storage and order-picking system of the initially mentioned type, in which the control system is configured to control the article transport system for retrieving the articles out of the article storage individually and independently of other picking orders for each picking order, and control the overhead conveyor system for directly transporting the transport means from the loading station into the sorting unit individually and independently of other picking orders for each picking order, and the sorting unit is configured for sorting the transport means according to the picking orders.

By the proposed measures, the initially mentioned disadvantages are overcome. In particular, a (batch) buffer between the loading station and the sorting unit is omitted. Instead, the articles are transported directly from the loading station to the sorting unit. The space and/or room required for the storage and order-picking system can therefore be reduced significantly. In the same way, the distances to be traveled by the articles in the storage and order-picking system are also shortened, which shortens the processing time of an order and/or the run-through time of an article through the storage and order-picking system.

In addition, dependencies between the individual orders are avoided by the proposed approach. Instead, retrieving articles from the article storage takes place individually and independently of other picking orders for each picking order. The transport of the transport means from the loading station also takes place individually and independently of other picking orders for each picking order. Thus, the technical complexity of the control system of the storage and order-picking system can be reduced, which makes the processes easier to handle.

Overall, the proposed measures result in a short processing time of an order and/or run-through time of an article through the storage and order-picking system. This means that the time between acceptance of an order and delivery of the articles is shortened with respect to the prior art.

In this regard, the steps of the provided method can take place in an automatic and/or automated manner. In particular, all steps of the provided method can take place in an automatic and/or automated manner.

"Direct transport" from the loading station to the sorting unit particularly means that no (chaotically organized) buffer is present between the loading station and the sorting unit. "Direct transport" can particularly also mean that the average dwell time of a transport means between the loading station and the sorting unit is less than one minute. The average dwell time can be based, for example on a calculation period of 15 minutes or, for example on an amount of 1000 transport means. Hence, the average dwell time of a transport means between the loading station and the sorting unit is particularly less than one minute per 15 minutes of calculation period or per 1000 transport means. The transport from the loading station to the sorting unit therefore takes place substantially without delay.

"Individually and independently of the other picking orders" particularly means that no batches are formed and/or a forming of batches is refrained from, meaning that no articles of different orders are combined. Retrieving articles from the article storage and transporting the transport means from the loading station into the sorting unit therefore also takes place substantially without delay.

In a "storage and order-picking system", articles can for example be delivered to an article acceptance zone and be taken over and then optionally be repacked and stored in a warehouse. The articles can also be picked according to an order, meaning that they can be retrieved from the warehouse, combined into an order and provided for transport at the article transfer zone. As opposed to a manufacturing process, the articles are not substantially changed between the article acceptance zones and the article transfer zone. However, a slight change in shape is possible, in particular in case of non-rigid bodies such as pouches or bags or other resilient packaging, for example from cardboard or plastic materials.

"Articles" are generally objects of merchandise trade and they are delivered at the article acceptance zone and transported, at the article transfer zone, to a customer according to an order. In the context of the invention, an "article" in particular is understood as an individual object that can be handled and/or an individual group of objects that can be handled.

An "article transfer zone" is understood to be that region, in which articles are removed from the storage and order-picking system, thus in particular a goods-out point.

An "article acceptance zone" is understood to be that region, in which articles are fed to the storage and order-picking system, thus in particular a goods-in point. In particular, delivered article carriers (e.g. pallets, cardboard boxes etc.) can be separated manually or automatically. This process is also referred to as "de-palletizing".

A "storage place" is a region in the storage and order-picking system, at which an article can be stored. A "storage area" is a region in the storage and order-picking system, which has a plurality of storage places for storing the articles. For example, the storage area can be configured as a stationary or mobile storage rack, which provides a plurality of storage places located next to one another or on top of one another. However, it is also conceivable that the storage area is a region on the floor of the storage and order-picking system, which is provided and/or reserved for placing and storing an article. Regions for walking and traveling are therefore no storage areas, although they can connect to them. A storage area can also have suspension rods for storing hanging articles. The sum of the storage areas forms the "article storage" of the storage and order-picking system.

A "loading aid" serves for storing and transporting the articles in the storage and order-picking system. Loading aids usually remain in the storage and order-picking system, but they can be taken over at the article acceptance zone or discharged at the article transfer zone—just like articles.

A "first loading aid" serves for transporting at least one article of a first order and/or from a first storage area to the loading station, and can be configured particularly as a container, a cardboard box, a tray or a pallet. In particular, the first loading aid has one or multiple of the following properties:

A first loading aid is stored in the first storage area standing upright or lying down, and is transported on the first article transport system standing upright or lying down. In principle, however, it would also be conceivable for a container-shaped loading aid to be transported hanging from an edge on container walls.

In the operating position, a first loading aid has a width, depth and height, wherein the following condition is fulfilled:

width+depth>2·height.

A first loading aid has a rigid floor and/or rigid walls with an elastic modulus>100 MPa.

In the operating position of the first loading aid, a transport surface, at which the first loading aid is in contact with the first storage area or with the first article transport system, is arranged below the receiving plane and/or loading plane of said loading aid.

A first loading aid does not have a hook and is therefore hookless and/or hook-free.

At this point, it is noted that not all first loading aids must have the same properties, but first loading aids may also be configured differently. Additionally, first loading aids may have multiple receiving areas/receiving compartments.

In the present invention, the "first storage area" particularly serves for storing the first loading aids. In particular, first loading aids are stored there (and no others). For example, the first storage area can be formed by storage racks and/or by other utility spaces for the first loading aids, in particular by utility spaces on the floor. A "storage rack" has multiple levels, each with a plurality of storage places. In particular, a storage rack can have multiple shelves arranged on top of one another, which are affixed to shelf stayers. For storing and retrieving first loading aids, automatically operated conveying vehicles may be provided in the first storage area.

A "second loading aid" serves for transporting at least one article of a second order and/or from the second storage area to the loading station. The second loading aid can be configured particularly as a clothes hanger for hanging articles. On its upper end, the clothes hanger can have a hook or a guide piece, with the help of which the clothes hanger can be stored in a hanging manner on storage overhead conveyors and/or be transported in a hanging manner on the second article transport system. It would also be conceivable that the second loading aid is formed as a hanging bag. It would further be conceivable that all second loading aids (and also the first loading aids) are differently formed as a hanging bag.

At this point, it is also noted that not all second loading aids must have the same properties, but second loading aids may also be configured differently. It is further pointed out that the clothes hanger is not limited to a particular shape and instead can also be referred to as "hanging article carrier". Furthermore, clothes hangers may be arranged outside on or inside the hanging bag. Such combined, second loading aids, which have both a hanging bag and means for hanging a clothes hanger, or even the clothes hanger itself, can be used particularly universally.

In the present invention, the "second storage area" particularly serves for storing the second loading aids. In particular, articles are stored there on second loading aids (and on no others). By way of example, the second storage area may comprise storage overhead conveyors. For storing and retrieving second loading aids, transport overhead conveyors can connect to the storage overhead conveyors. In the second storage area, different second loading aids in particular can be stored, for example both hanging bags and clothes hangers.

A "third loading aid" can particularly be configured like a first loading aid or like a second loading aid. Accordingly, the "third storage area" can be configured like the first storage area and/or like the second storage area. A third loading aid can also be configured as a hanging bag and/or as a clothes hanger.

A "transport means" serves for transporting the articles from the loading station to the sorting unit and from the sorting unit to the packing station, possibly also for transporting the articles within the sorting unit. A transport means can particularly be configured as a hanging bag or comprise one, and can have one or multiple of the following properties:

A hanging bag is stored in the third storage area in a suspended manner and/or is transported on the overhead conveyor system in a suspended manner In a suspended condition (operating position), a hanging bag has a width, depth and height, wherein the following condition is fulfilled:

width+depth<2·height.

A hanging bag has a floor and/or walls made of flexible material, preferably of a textile (textile fabric) or a foil (plastic foil).

A support surface, at which the hanging bag is in contact with the third storage area or with the overhead conveyor system, has a hook shape or a bracket shape.

A support surface, at which the hanging bag is in contact with the third storage area or with the overhead conveyor system, is configured in the shape of a roller and is connected to a hook or bracket of the hanging bag.

In the operating position of the hanging bag, a support surface, at which the hanging bag is in contact with the third storage area or with the overhead conveyor system, is arranged above the filling plane of said hanging bag.

In particular, a hanging bag comprises a front wall, a rear wall, a floor, a "storage space" limited by the front wall, the rear wall and the floor and a loading opening and/or unloading opening configured at the hanging bag at a first side and limited by the front wall, the rear wall and the floor. The hanging bag may at a second side also have a side wall stop, against which the article(s) can be applied. In particular, the front wall, the rear wall and the floor may be formed as a single piece, for example by a length of fabric or woven cloth, which is mounted at an overhead conveyor/suspension rod at its upper end and forms a loop in the floor area. In a closed position, the front wall and the rear wall have only a small distance from each other, whereby the loading opening and unloading opening has a small surface area and the storage space of the hanging bag has a small volume. In the case of a length of fabric or woven cloth, its upper ends then equally have only a small distance from each other, and the loop formed by the length of fabric or woven cloth is narrow. In the closed position, the article(s) can thus be stored and transported in a narrow space. In an open position, in contrast, the front wall and the rear wall have a large distance from each other, whereby the loading opening and unloading opening has a large surface area and the storage space of the hanging bag has a large volume. In the case of a length of fabric or woven cloth, its upper ends then equally have a large distance from each other, and the loop formed by the length of fabric or woven cloth is wide. In the open position, the hanging bag is thus easy to load and unload.

Said length of fabric or woven cloth, which form the storage space, can be connected to a guide piece via a suspended support, which is guided on the overhead conveyor. The guide piece can have rollers, which are mounted so as to be rotatable and roll off on the overhead conveyor, and thus be configured as a "carriage". Of course, providing rollers on a guide piece is not obligatory, but it can also be configured as a "gliding carriage" which glides on the overhead conveyor. A corresponding guide piece can also be arranged on a clothes hanger (without a hanging bag).

It is also conceivable that a hanging bag or a clothes hanger have a hook, with which the hanging bag or the clothes hanger can be hooked in, where required, on said guide piece (for instance, in a bore especially provided therefor in the guide piece or on a hook arranged on a guide piece). This means that a hanging bag or a clothes hanger can be affixed to such a guide piece where needed. Such a guide piece can also be referred to as an "suspension adapter".

An exemplary hanging bag is disclosed, for example, in the German utility model DE 20 2017 106 993 U1, DE 20 2017 100 206 U1 or the Austrian patent application A 50320/2018.

It should also be noted in this context that not all transport means must have the same properties, but transport means may also be configured differently. In addition, transport means may have multiple storage zones/storage compartments. Furthermore, clothes hangers may be arranged outside on or inside the hanging bag. Such combined transport means, which have both a hanging bag and means for hanging a clothes hanger, or even the clothes hanger itself, can be used particularly universally.

A "shipping loading aid" serves for receiving the articles unloaded from a transport means. In particular, a shipping loading aid can be constructed like a first loading aid and/or have its properties. Shipping loading aids can, however, also be constructed like a second loading aid and/or have its properties. Articles may leave the storage and order-picking system in said shipping loading aids, or be unloaded from the shipping loading aids at the goods-out point.

The "operating position" of a loading aid or transport means is characterized in that articles can be stored therein and can be transported with the aid of the article transport system or the overhead conveyor system.

The "article transport system" serves for transporting the loading aids from the storage areas to the loading station. In particular, the "first article transport system" serves for transporting the first loading aids from the first storage area to the loading station, the "second article transport system" serves for transporting the second loading aids from the second storage area to the loading station, and the "third article transport system" serves for transporting the third loading aids from the third storage area to the loading station. The third article transport system can additionally be configured to transfer third loading aids directly (i.e. bypassing the loading station) to the overhead conveyor system.

The "overhead conveyor system" serves for transporting the transport means from the loading station to the sorting unit and from the sorting unit to the packing station, possibly also for transporting the transport means within the sorting unit. An overhead conveyor system comprises multiple "overhead conveyors", in particular "transport overhead conveyors".

An "overhead conveyor" is a track, on which hanging bags and/or clothes hangers can be stored and/or transported in a suspended manner A "storage overhead conveyor" thus is an overhead conveyor, on which hanging bags and/or clothes hangers can be stored in a suspended manner, and which are arranged particularly in the second and/or third storage area. A "transport overhead conveyor" is an overhead conveyor via which hanging bags and/or clothes hangers can be transported suspended. If the supporting surface, at which the hanging bag or the clothes hanger is in contact with the overhead conveyor, is configured hook-shaped or bracket-shaped or as a gliding carriage, the hook or bracket of the hanging bag/the clothes hanger glides along the overhead conveyor during transport. If the supporting surface, at which the hanging bag or the clothes hanger is in contact with the overhead conveyor, is configured roller-shaped and/or as a carriage, the roller of the hanging bag/the clothes hanger rolls along the overhead conveyor during transport.

The article transport system and/or the overhead conveyor system comprises particularly elements of (a) "fixed-installation conveyor(s)" or is built therefrom. For the transport of articles, "(a) fixed-installation conveyor(s)" require(s) permanently-integrated facilities. For example, a lift requires a frame at which a lifting platform is moved. In contrast to this, the lifting platform alone is non-functional. (A) fixed-installation conveyor(s) is/are in particular characterized in that it/they cannot be extracted from the storage and order-picking system without loosening fastenings. (A) fixed-installation conveying device(s) is/are to be understood to mean, in particular, roller conveyors, belt conveyors, chain conveyors and suchlike. On the first article transport system, the first loading aids are transported particularly standing upright. On the second article transport system, the second aids are transported particularly suspended. Transport means are also transported suspended on the overhead conveyor system. On the third article transport system, the articles can be transported in a mixed way of transport.

A "storage-and-retrieval device" is a conveying vehicle operated in an automated manner for transporting articles, which travels on rails independently and/or driverlessly and may be designed as a single-level-storage-and-retrieval unit (also referred to as "shuttle") or as a multilevel-storage-and-retrieval unit. A storage and retrieval device has in particular a transport platform, on which the articles to be transported are received temporarily. Instead of the transport platform, or additionally to it, the storage and retrieval device may also have a (telescopable) suspension rod and/or overhead conveyor for receiving hanging bags and/or clothes hangers. For example, the transport platform/suspension rod may be permanently affixed to the storage and retrieval device, yet the transport platform/suspension rod may also be vertically and/or laterally movable relative to an underframe of the storage and retrieval device, for example to be able to in-feed articles into a storage rack and out-feed them from the storage rack. Wheels, of which at least one is driven, are arranged at the underframe. Further, a storage and retrieval device also comprises an electronic control for receiving commands by a superordinate control and for controlling/regulating the movements of the storage and retrieval device. For their operation, storage-and-retrieval devices require elements of fixed-installation conveying device(s) (namely the rails). For this reason, storage-and-retrieval devices are, within the scope of the invention, counted among fixed-installation conveying device(s).

A "loading device" is a device and/or a region or location, at or in which articles can be loaded into transport means by loading aids. The loading device may have a loading control for controlling the loading process of the articles. Yet it would also be conceivable that the loading process is controlled, alternatively or additionally, by the control system of the storage and order-picking system. A "loading station" comprises multiple loading devices and/or forms the entirety of the loading devices.

A "packing device" is a device and/or a region or location, at or in which articles can be loaded into or onto a shipping loading aid by the transport means. The packing device may have a packing control for controlling the packing process of. Yet it would also be conceivable that the packing process is controlled, alternatively or additionally, by the control system of the storage and order-picking system. A "packing station" comprises multiple packing devices and/or forms the entirety of the packing devices.

A loading station and a packing device may respectively be configured for automatic, manual or mixed automatic/manual operation, wherein the manual operation may in particular be computer-aided. To that end, said devices may various different functional units, for example a robot and/or a tilting device for tilting a first loading aid and/or a device for opening a hanging bag at a supply position (e.g. for reasons of ergonomics) as well as an output unit (e.g. a display or a voice output unit), an input unit (e.g. a keyboard, a touch display or a voice input unit) and/or a capturing unit (e.g. a scanner). In automatic or mixed automatic/manual operation, the robot and/or the tilting device can be instructed to execute a particular sequence of movements. In manual or mixed automatic/manual operation, a worker can be instructed with the help of the output unit to execute a particular process. The worker can offer feedback via the input unit and/or the capturing unit. The above-mentioned process is therefore done in a computer-aided manual manner. Said functional units may be controlled by a control of the respective device, i.e. by the loading control of the loading device or the packing control of the packing device. Yet it would also be conceivable that said functional units are controlled, alternatively or additionally, by the control system of the storage and order-picking system.

In "automatic" operation, specified sequences of movement are performed independently, e.g. by a "robot". In "automated operation", a facility can work, fully or partially, without human assistance. "Automated" operation may accordingly be automatic and/or computer-aided manual operation. In "computer-aided manual" operation, a worker receives instructions from a control and, if applicable, offers feedback to the control. In "mixed manual/automatic" operation, parts of a process are executed automatically (e.g. by a robot), other parts by a worker (e.g. in a computer-aided manual manner).

A "supply position" is generally a position at which a loading aid, a transport means, or a shipping loading aid is supplied and/or provisioned. At this position, a loading and/or unloading of the respective loading aid or transport means is possible. For example, the supply position may be formed by a stopping position for a loading aid on the article transport system or by a stopping position for a transport means on the overhead conveyor system.

An "loading supply position" is therefore a supply position which is arranged at a loading device and/or forms part of same. An "packing supply position" is therefore a supply position which is arranged at a packing device and/or forms part of same.

A "sorting unit" is a facility with which articles (more precisely, the transport means containing the articles) can be brought into a specified or specifiable sequence. The sorting operation can particularly take place in multiple "sorting stages", which are passed through in succession. A sorting unit or sorting stage may also comprise multiple "sorting lanes", in which the articles/transport means are received temporarily. The sorting unit may be configured as a matrix sorter, for example.

A "shipping facility" serves for providing loaded shipping loading aids at the article transfer zone and/or at the goods-out point. In a simple case, the shipping facility is formed by (a) conveying device(s) leading away from the packing device.

An "article supply store" is a storage area in which predominantly or exclusively new articles are stored. "(A) new article(s)" is/are (an) article(s) which has/have not yet been dispatched and is/are available for an order.

A "return articles store" is a storage area in which predominantly or exclusively return articles are stored. "(A) return article(s)" is/are article(s) which has/have already been dispatched but was/were sent back by the recipient and is/are available for a new order.

An "order for picking articles" ("picking order" or "order" in short) within the scope of the invention comprises at least one order line, whose allocated articles are stored in a storage area. For example, socks may be stored in the first storage area in first loading aids, which are configured as containers. Shirts, in contrast, may be stored in a second storage area in second loading aids, which are configured as clothes hangers. An order is electronically acquired and is present as a data set. For example, acquiring an order takes place in the control system of the storage and order-picking system. However, it would also be conceivable that acquiring an order is carried out by a separate order-processing computer, which is connected to the control system of the storage and order-picking system. An order by a customer may comprise one order or multiple orders.

An "order line" specifies (an) article(s) (at least) according to its/their type of article and its/their number of pieces to be picked. For example, an order line may contain: "1 piece, tagliatelle, 1 kg" or "10 pieces, mineral water 1 l." The article(s) may in principle be of different kinds and in particular also comprise items of clothing. For example, an order line may therefore also contain: "1 piece, "shirt, white, size 42" or "3 pieces, jeans, size 34/34" or "10 pieces, socks, black, size 43." An order may comprise a single order line, for example "10 pieces, mineral water 1 l", or multiple order lines, for example "1 piece, "shirt, white, size 42" or "3 pieces, jeans, size 34/34".

A "type of article" states the kind of (an) article(s). For example, "tagliatelle, 1 kg" or "mineral water 1 l" may be provided as the type of article. The type of article may in particular also comprise items of clothing. For example, "shirt, white, size 42" or "jeans, size 34/34" or "sock, black, size 43" may be provided as the type of article.

A "control system" of the storage and order-picking system serves particularly for acquiring an order and for executing the same. For this purpose, the control system is connected, in terms of control technology, to elements of the storage and order-picking system, in particular to the conveying device(s) of the storage and order-picking system. The control system may particularly comprise a computer with a program running thereon and be formed at least partly by a programmable logic controller.

Within the scope of the invention, "order-picking" is to be understood to mean the compilation of articles for a picking order, in the narrower sense the loading of a shipping loading aid with the article(s) of the first order and/or the article(s) of the second order.

"Retail" relates to consignments of articles to the intermediate trade or end sellers. "E-commerce" relates to consignments of articles to the end customer. Orders by the intermediate trade/end seller are comprehensive and often contain many articles of the same type of article, whereas orders by the end customers are less comprehensive and contain few articles of the same type of article.

Advantageous designs and further advancements of the invention result from the sub-claims as well as from the description in combination with the figures.

A method comprising the following additional steps is also advantageous:
retrieving articles from the article storage individually and independently of other picking orders for each picking order, wherein retrieving comprises
transporting an article out of the article storage according to a third picking order to the loading station,
providing the article(s) according to the third picking order at the loading station,
providing a transport means of the overhead conveyor system at the loading station,
transferring the article(s) for the third picking order into the transport means of the overhead conveyor system, and
transporting the transport means via the overhead conveyor system from the loading station directly to the packing station, bypassing the sorting unit.

This way, articles can also be picked according to a third picking order. Sorting the articles is omitted in this variant, whereby the processing time of an order and/or the run-through time of an article through the storage and order-picking system is shortened even further.

It is also advantageous if the hanging articles are transported by the overhead conveyor system from the third storage area to the sorting unit or packing station. Consequently, it is also advantageous in the case of a storage and order-picking system if the control system is configured to control the overhead conveyor system for transporting the hanging articles out of the third storage area to the sorting unit or to the packaging unit. Thus, the sorting unit may be bypassed where needed. Sorting the articles may be omitted in this variant, whereby the processing time of an order and/or run-through time of an article through the storage and order-picking system is shortened.

It is favorable if the article storage comprises a first storage area with first storage places and a first article transport system operated in an automated manner for transporting the articles between the first storage places and the loading station, wherein the articles, when retrieved from the first storage area, are taken over from the first storage places by the first article transport system and are transported by the first article transport system to the loading station. Consequently, it is also advantageous in the case of the storage and order-picking system if the control system is configured to control the first article transport system, during the retrieval of the articles from the first storage area, to take over the articles from the first storage places and to transport the articles to the loading station. This way, the articles can be transported automatically from the first storage area to the loading station.

It is also favorable if the lying articles are stored in the first storage area with first loading aids. This way, storing lying articles in the first storage area is possible in a space-saving manner. In particular, multiple articles are stored in a first loading aid.

It is further favorable if the article storage comprises a second storage area with second storage places and a second article transport system operated in an automated manner for transporting the articles between the second storage places and the loading station, wherein the articles, when retrieved from the second storage area, are taken over from the second storage places by the second article transport system and are transported by the second article transport system to the loading station. Consequently, it is also advantageous in the case of the storage and order-picking system if the control system is configured to control the second article transport system, during the retrieval of the articles from the second storage area, to take over the articles from the second storage places and to transport the articles to the loading station. This way, the articles can also be transported automatically from the second storage area to the loading station.

It is additionally favorable if the hanging articles in the second storage area are stored with second loading aids. This way, storing hanging articles in the second storage area is also possible in a space-saving manner. In particular, exactly one article is stored on a second loading aid.

It is also favorable if the article storage comprises a third storage area with third storage places and a third article transport system operated in an automated manner for transporting the articles between the third storage places and the loading station, wherein the articles, when retrieved from the third storage area, are taken over from the third storage places by the third article transport system and are transported by the third article transport system to the loading station. Consequently, it is also advantageous in the case of the storage and order-picking system if the control system is configured to control the third article transport system, during the retrieval of the articles from the third storage area, to take over the articles from the third storage places and to transport the articles to the loading station. This way, the articles can also be transported automatically from the third storage area to the loading station.

In addition, it is favorable if the lying articles in the third storage area are stored with third loading aids. This makes storing lying articles and hanging articles in the third storage area possible in a flexible manner. In particular, the third loading aids can be constructed like the first loading aids or like the second loading aids, or be configured as a hanging bag.

It is advantageous if the loading station comprises a first loading device and a second loading device, wherein the articles, when retrieved from the first storage area, are taken over from the first storage places by the first article transport system and are transported by the first article transport system to the loading device, and the articles, when retrieved from the second storage area, are taken over from the second storage places by the second article transport system and are transported by the second article transport system to the loading device. Accordingly, it is also advantageous if the control system is configured to is configured to control the first article transport system, during the retrieval of the articles from the first storage area, to take over the articles from the first storage places and to transport the articles to the loading device, and to control the second article transport system, during the retrieval of the articles from the second storage area, to take over the articles from the second storage places and to transport the articles to the loading device. This way, the loading station can have loading devices, which are constructed differently, and which are specially configured either to manipulate the first loading aids or to manipulate the second loading aids.

Furthermore, it is advantageous if the loading station comprises a first loading device and a second loading device, wherein the articles, when retrieved from the third storage area, are taken over from the third storage places by the third article transport system and are transported by the third article transport system either to the first loading device or to the second loading device. Consequently, it is also advantageous if the control system is configured to control the third article transport system, during the retrieval of the articles from the third storage area, to take over the articles from the third storage places and to optionally transport the articles to the first loading device or to the second loading device. This allows selecting the loading device for transferring the articles into a transport means that is the most suitable for the third loading aid in each case. The loading process can therefore take place quickly and trouble-free for differently-constructed third loading aids.

It is also advantageous if the article storage comprises a third storage area with third storage places and a third article transport system operated in an automated manner for transporting the articles between the third storage places and the overhead conveyor system, wherein the articles in the third storage area comprise hanging articles, which hanging articles are stored with the third loading aid, and the hanging article(s), when retrieved from the third storage area, is/are taken over from the third storage places by the third article transport system, and is transferred by the third article transport system (directly, bypassing the loading station) to the overhead conveyor system. Consequently, it is also advantageous in the case of a storage and order-picking system if the control system is configured to control the third article transport system, during the retrieval of the articles from the third storage area, to take over the articles from the third storage places and to transfer the articles to the overhead conveyor system. This way, transferring the articles at the loading station from a third loading station into a transferring may be omitted. In this case, the third loading aid itself acts as a transport means instead. The processing time of an order and/or run-through time of an article through the storage and order-picking system can thus be shortened even further.

It is favorable if the third loading aid from the third storage area is formed
- by a hanging bag with a suspended support for the transport by the third article transport system and a storage space for receiving the article(s), and/or
- a hanging bag with a suspended support for the transport by the third article transport system and with a storage space for receiving the article(s) and a transport hook for suspending the article(s), and/or
- a suspension adapter for suspending the article(s).

This way, lying articles in the third storage area can be stored in a hanging bag, or hanging articles in a hanging bag or hanging articles without a hanging bag, for example on suspension adapters.

Additionally, it is favorable if at least one of the first and second storage areas is configured as an article supply store, and the third storage area is configured as a return articles store. This enables efficient handling of new articles and return articles. (A) new article(s) is/are usually delivered to the storage and order-picking system in large quantities, sorted by type of article, whereas return article(s) usually comprise(s) individual pieces of different types of articles. Return articles can be stored in the third storage area, in particular in hanging bags, preferably separately.

A method comprising the following additional steps is also advantageous:
- analysis of the article(s) stored in the article storage in one of the first and second storage areas and the third storage area by means of the control system,
- determining the article(s) required for one of the picking orders,
- retrieving articles from the third storage area, if it was determined in the analysis that the required article(s) is/are stored both in one of the first and second storage areas and in the third storage area.

Hence, the article(s) is/are preferably retrieved from the third storage area. If return articles are stored in the third storage area, they are preferably prioritized to be dispatched again. The third storage area can thus be kept small.

However, a method comprising the following additional steps is also advantageous:
- analysis of the article(s) stored in the article storage in one of the first and second storage areas and the third storage area by means of the control system,
- determining the article(s) required for one of the picking orders,
- retrieving articles from one of the first and second storage areas, if it was determined in the analysis that the required article(s) is/are stored both in one of the first and second storage areas and in the third storage area.

Hence, the article(s) is/are preferably retrieved predominantly from the first and second storage areas. If new articles are stored in the first and second storage areas, these will be delivered preferably. The first and second storage areas can thus be kept small.

It is favorable if after transferring the article(s) for one of the first and second picking orders, the first and/or second loading aid is transported back into the article storage if there still is/are article(s) in the first and/or second loading aid. Thus, currently not required articles are subsequently available for a further picking order.

It is favorable if the transport means has a characterizing feature and a characterizing feature of the article(s) is detected by the control system, wherein after transferring the article(s) into the transport means, a detection means automatically detects the characterizing feature of the transport means and the article(s) is/are data-technically linked to the associated transport means by the control system. In particular, it is advantageous if each transport means has a characterizing feature, which is readable in a contactless manner, with an unambiguous identifying information, in particular a characterizing feature which is readable optically or by radio. Thus, an article can be easily located within the storage and order-picking system, and the picking operation (in concrete terms loading of a shipping loading aid) can be carried out in an easy manner. For example, the characterizing feature can be formed of data which is stored on an RFID tag ("Radio Frequency Identification tag") of the transport means or which is applied to the transport means in the form of a one-dimensional or two-dimensional barcode. Then, the detection means is a device for reading the RFID tag and/or the barcode.

It is favorable if at least one of the transport means is loaded with more than one article for one of the first and second picking orders. Hence, the number of transport means used for one picking order and thus the size of the overhead conveyor system can be reduced.

Moreover, it is advantageous if sorting the transport means in the sorting unit comprises sorting the transport means according to an order of the articles within the respective picking order. Hence, the transport means, for each picking order, arrive at the packing station in the desired order.

It is also advantageous if the articles are removed from the transport means at the packing station and transferred into shipping loading aids. In this context, it is further favorable if after transferring the one or multiple article(s) for one of the first, second and third picking orders from the one or multiple transport means into the at least one shipping loading aid, the at least one shipping loading aid is transported to a shipping facility. This way, shipping loading aids designed particularly for shipping can be used, in particular disposable containers that leave the area of the storage and order-picking system, for example at a shipping facility designed as a loading ramp for trucks.

It is also favorable if the first article transport system is formed by a retrieval conveyor system to transport the articles from the first storage places to the loading station and a storage conveyor system to transport the articles from the loading station to the first storage places. Hence, the first article transport system can be used both for storing and retrieving articles, in particular also for returning partially or completely unloaded first loading aids.

It is also favorable if the second article transport system is formed by a retrieval conveyor system to transport the articles from the second storage places to the loading station and a storage conveyor system to transport the articles from the loading station to the second storage places. Hence, the second article transport system can also be used both for storing and retrieving articles, in particular also for returning partially or completely unloaded second loading aids.

It is advantageous if the sorting unit has a first sorting stage and the first sorting stage has one or multiple sorting lanes, wherein the first sorting stage is designed to buffer the transport means of a single first picking order or single second picking order per sorting lane. Hence, the sorting operation can be carried out particularly efficiently and quickly. Thus, in particular sorting of the transport means according to an order of the articles within the respective picking order is possible.

Moreover, it is advantageous if the sorting unit has a first sorting stage and at least one subsequent second sorting stage, wherein the second sorting stage is designed for sorting the transport means for one of the first and second picking orders according to a predefined order. Hence, the transport means, for each picking order, arrive at the packing station in the desired order.

At this point, it should be noted that the variants and advantages disclosed for the presented storage and order-picking system can likewise refer to the presented method and vice versa.

For the purpose of better understanding of the invention, it will be elucidated in more detail by means of the figures below.

These show in a respectively very simplified schematic representation.

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure, and in case of a change of position, are to be analogously transferred to the new position.

Figure 1:
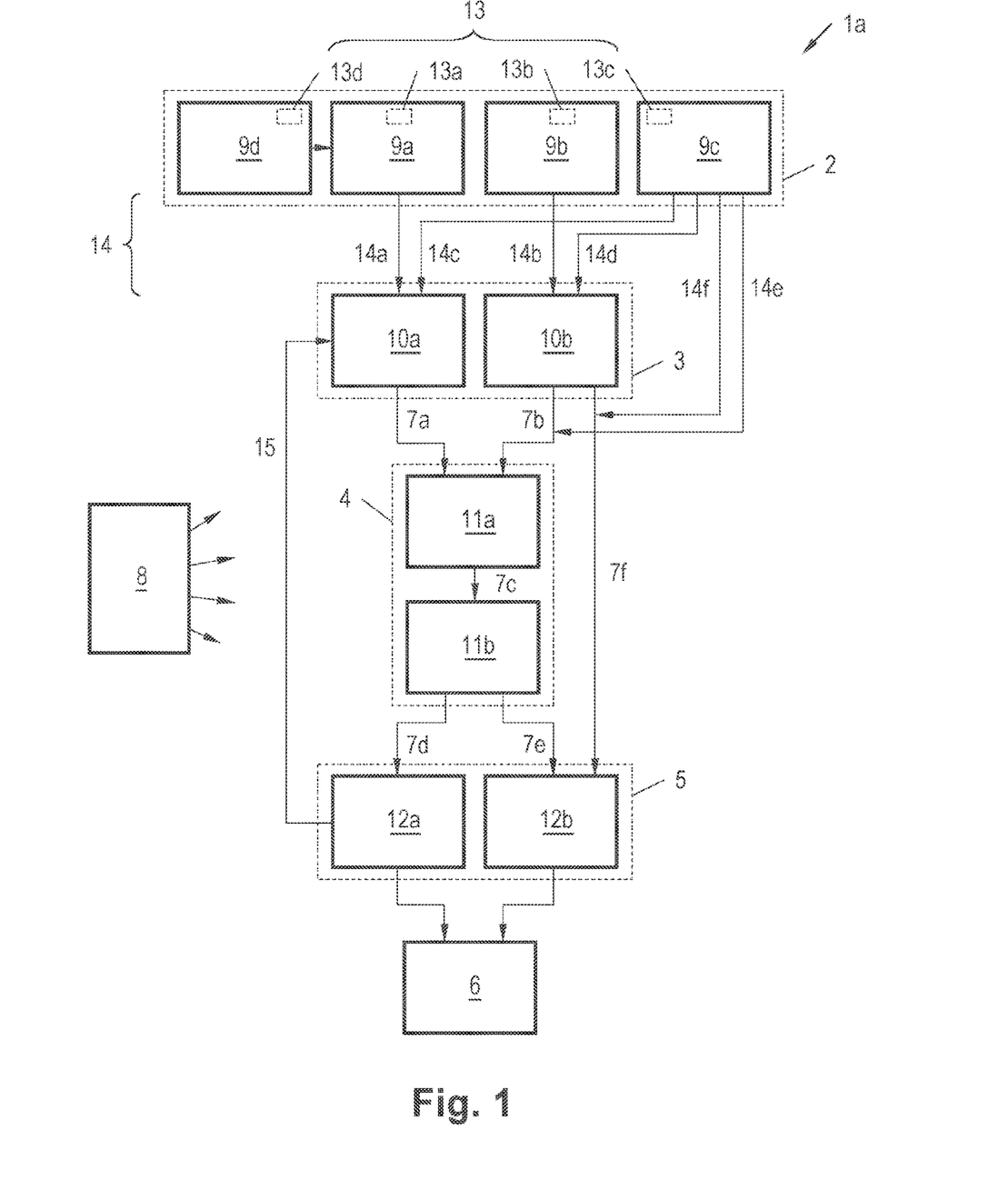
FIG. 1 a first embodiment of a schematically shown storage and order-picking system and FIG. 2 a second embodiment of a storage and order-picking system shown in somewhat more detail.

FIG. 1 shows a schematic representation of an exemplary storage and order-picking system 1a, which comprises an article storage 2, a loading station 3, a sorting unit 4, a packing station 5, a shipping facility 6, an overhead conveyor system 7a . . . 7f, as well as a control system 8. However, a buffer device for collecting articles for different picking orders, which according to the prior art is arranged between the loading station 3 and the sorting unit 4, is not provided.

The article storage 2 in this example comprises four different storage areas 9a . . . 9d, the loading station 3 comprises a first loading device 10a and a second loading device 10b, the sorting unit 4 comprises a first sorting stage 11a and at least one subsequent second sorting stage 11b, and the packing station 5 comprises a first packing device 12a and a second packing device 12b.

The storage areas 9a . . . 9d each comprise multiple storage places 13, which is symbolically shown in FIG. 1. In concrete terms, the first storage area 9a comprises multiple first storage places 13a, the second storage area 9b comprises multiple second storage places 13b, the third storage area 9c comprises multiple third storage places 13c and the fourth storage area 9d comprises multiple fourth storage places 13d.

The overhead conveyor system 7a . . . 7f connects the loading station 3, the sorting unit 4 and the packing station 5. In concrete terms, a first section 7a of the overhead conveyor system connects the first loading device 10a with the first sorting stage 11a, a second section 7b of the overhead conveyor system connects the second loading device 10b with the first sorting stage 11a, a third section 7c of the overhead conveyor system connects the first sorting stage 11a with the second sorting stage 11b, a fourth section 7d of the overhead conveyor system connects the second sorting stage 11b with the first packing device 12a, a fifth section 7e of the overhead conveyor system connects the second sorting stage 11b with the second packing device 12b and a sixth section 7f of the overhead conveyor system connects the second loading device 10b with the second packing device 12b.

Moreover, FIG. 1 shows an article transport system 14. In concrete terms, FIG. 1 shows a first article transport system 14a, which connects the first storage area 9a with the loading station 3 (in concrete terms with the first loading device 10a), a second article transport system 14b, which connects the second storage area 9b with the loading station 3 (in concrete terms with the second loading device 10b), a first section 14c of a third article transport system, which connects the third storage area 9c with the first loading device 10a of the loading station 3, and a second section 14d of the third article transport system, which connects the third storage area 9c with the second loading device 10b of the loading station 3. The article transport system 14 further comprises an optional third section 14e of the third article transport system, which opens into the second section 7b of the overhead conveyor system, whereby the third storage area 9c is directly connected to the sorting unit 4, as well as an optional fourth section 14f of the third article transport system, which opens into the sixth section 7f of the overhead conveyor system, whereby the third storage area 9c is directly connected to the packing station 5.

Lastly, the storage and order-picking system 1a comprises a return conveying track 15 from the packing station 5 back to the loading station 3.

Figure 2:
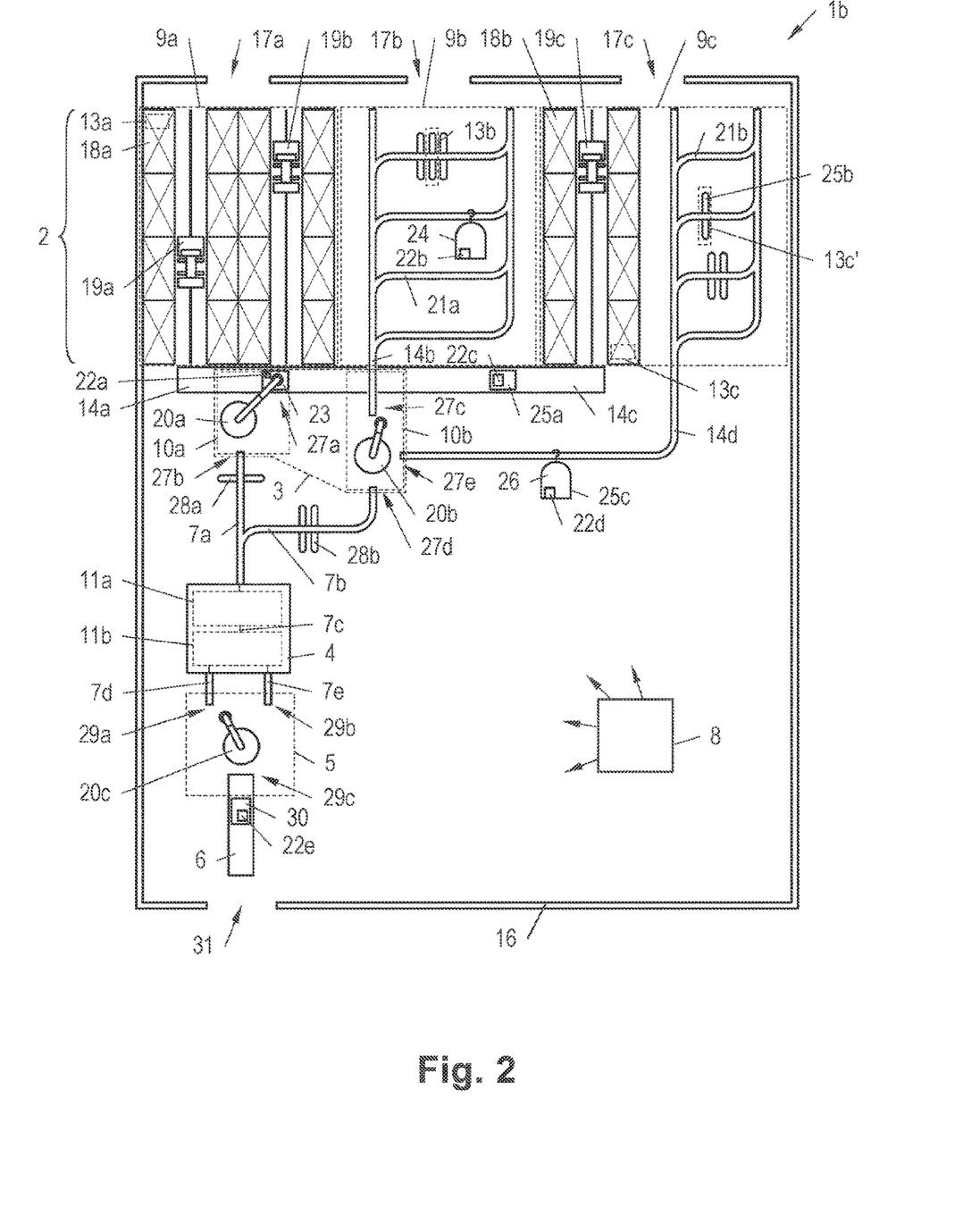

FIG. 2 shows a somewhat more detailed representation of a further exemplary storage and order-picking system 1b, which is structurally similar to the storage and order-picking system 1a shown in FIG. 1.

In concrete terms, the storage and order-picking system 1b, in turn, comprises an article storage 2, a loading station 3, a sorting unit 4, a packing station 5, a shipping facility 6 and an overhead conveyor system 7a . . . 7e as well as a symbolically shown control system 8, which are accommodated in a building 16.

The article storage 2, in this example, comprises three different storage areas 9a . . . 9c. The loading station 3, in turn, comprises a first loading device 10a and a second loading device 10b. The sorting unit 4 is merely shown in a symbolic manner and can comprise one sorting stage 11a or multiple sorting stages 11a, 11b. The packing station 5 has a slightly different structure than in FIG. 1 and, in this example, comprises two sections 7d, 7e of the overhead conveyor system on the input side and a shipping facility 6 on the output side.

In concrete terms, a first section 7a of the overhead conveyor system connects the first loading device 10a with the sorting unit 4, a second section 7b of the overhead conveyor system connects the second loading device 10b with the sorting unit 4, a fourth section 7d of the overhead conveyor system connects the sorting unit 4 with the packing station 5 and a fifth section 7e of the overhead conveyor system also connects the sorting unit 4 with the packing station 5.

The first article transport system 14a, in turn, connects the first storage area 9a with the first loading device 10a of the loading station 3, the second article transport system 14b connects the second storage area 9b with the second loading device 10b of the loading station 3, the first section 14c of the third article transport system connects the third storage area 9c with the first loading device 10a of the loading station 3, and the second section 14d of the third article transport system connects the third storage area 9c with the second loading device 10b of the loading station 3.

The first storage area 9a is arranged in the region of a first article acceptance zone 17a, the second storage area 9b is arranged in the region of a second article acceptance zone 17b and the third storage area 9c is arranged in the region of a third article acceptance zone 17c.

The first storage area 9a comprises multiple storage racks 18a with storage places 13a, as well as storage and retrieval devices 19a and 19b, which travel in rack aisles extending between the storage racks 18a. The first article transport system 14a, which leads to a first robot 20a of the first loading device 10a, is arranged on that end of the rack aisles which is located opposite to the first article acceptance zone 17a.

The third storage area 9c also comprises multiple storage racks 18b with storage places 13c, as well as a storage and retrieval device 19c, which travels in the rack aisle extending between the storage racks 18b. The first section 14c of the third article transport system, which also leads to the first robot 20a of the first loading device 10a, is arranged on that end of the rack aisle which is located opposite to the third article acceptance zone 17c. In this example, the first article transport system 14a and the first section 14c of the third article transport system are formed as a common conveying track. However, this is not an obligatory condition.

The second storage area 9b comprises multiple storage overhead conveyors 21a with storage places 13b. The second article transport system 14b, which is designed as a transport overhead conveyor and leads to a second robot 20b of the second loading device 10b, is arranged on that end of the second storage area 9b located opposite to the second article acceptance zone 17b.

Lastly, the third storage area 9c also comprises multiple storage overhead conveyors 21b with storage places 13c'. The second section 14d of the third article transport system, which is designed as a transport overhead conveyor and leads to a second robot 20b of the second loading device 10b, is arranged on that end of the third storage area 9c located opposite to the third article acceptance zone 17c.

Lastly, a third robot 20c is located in the region of the packing station 5.

In the example shown in FIG. 2, the second storage area 9b and the third storage area 9c comprise storage overhead conveyors 21a, 21b as well as transport overhead conveyors 14b, 14d. However, this is not an obligatory condition. Hanging articles can also be stored on storage suspension rods in a rack-like structure in the second storage area 9b and/or third storage area 9c and can be stored and retrieved by means of a storage and retrieval device. Instead of or in addition to a transport platform, such a storage and retrieval device comprises a transport suspension rod. The hanging articles can thus be transferred between a storage suspension rod and a transport suspension rod. Multiple storage suspension rods can be arranged on top of one another in different planes in the rack-like structure. Said storage and retrieval devices can thus be single-plane storage and retrieval devices or multi-plane storage and retrieval devices. Such a storage system is for example disclosed in the Austrian patent application AT 516 612 B1.

The storage and order-picking system 1a shown in FIG. 1 and/or the storage and order-picking system 1b shown in FIG. 2 functions as follows:

Articles 22a ... 22e are delivered to the article acceptance zones 17a ... 17c and are stored in the storage areas 9a ... 9c. In particular, lying articles are stored in the first storage area 9a by means of first loading aids 23, hanging articles are stored in the second storage area 9b by means of second loading aids 24, and lying articles and hanging articles are stored in the third storage area 9c by means of third loading aids 25a ... 25c.

The first loading aid 23 can in particular be designed as a container, carton, tray or pallet. In particular, the first loading aid 23 comprises a floor with a receiving location on its upper side, onto which at least one article 22a, preferably a plurality of articles 22a, can be placed, and a transport surface on its lower side, by which the first loading aid 23 is transportable, as well as side walls rising up from the floor.

The second loading aid 24 can be configured particularly as a clothes hanger or hanging bag for hanging articles. On its upper end, the clothes hanger or the hanging bag can have a hook or a guide piece, with the help of which the clothes hanger/the hanging bag can be stored in the storage overhead conveyors 21a and/or be transported on the second article transport system 14b. Such a hanging bag is for example disclosed in the Austrian patent application A 50320/2018.

The third loading aids 25a ... 25c can in particular be designed as a container, carton, tray or pallet and be stored in the storage racks 18b, or be designed as a clothes hanger or hanging bag and be stored on the storage overhead tracks 21b. The statements regarding the first loading aid 23 and the second loading aid 24 analogously apply to the third loading aids 25a ... 25c.

The articles 22a ... 22e can generally be delivered individually or in delivery article carriers (not shown). In the course of the in-feeding process, the articles 22a ... 22e can be separated, yet this is not mandatory. Moreover, transferring into or onto a first loading aid 23, a second loading aid 24 or a third loading aid 25a ... 25c is not mandatory, such that it would also be conceivable to store a delivery article carrier directly in article storage 2. In particular, it is conceivable that articles 22a ... 22e, which are delivered on a clothes hanger or in a hanging bag, are suspended on a suspension adapter and are stored in the second storage area 9b or in the third storage area 9c.

In the context of the storage and order-picking system 1b, some articles 22a ... 22d are shown in a symbolic manner in loading aids 23 ... 25c. In concrete terms, one article 22a is shown in the first loading aid 23, one article 22b is shown in the second loading aid 24, one article 22c is shown in the third loading aid 25a and one article 22d is shown in the third loading aid 25c. In this example, the second loading aid 24 and the third loading aid 25c are each formed as hanging bags and are rotated into the drawing plane for ease of representation. Thus, a storage space 26 (explicitly designated for the third loading aid 25c), in which the article 22d is stored, is visible in FIG. 2. In reality, the hanging bags 24, 25c of course hang downwards and are then shown like the other hanging bags shown in FIG. 2.

The storage and retrieval devices 19a and 19b can be assigned to the first article transport system 14a, meaning that they are a part thereof. Analogously, the storage and retrieval device 19c can be assigned to the third article transport system 14c, 14d, meaning that it is a part thereof. Accordingly, the first article transport system 14a then comprises a retrieval conveyor system to transport the article(s) 22a from the first storage places 13a to the loading station 3 and a storage conveyor system to transport the article(s) 22a from the loading station 3 to the first storage places 13a. Moreover, the third article transport system 14c then comprises a retrieval conveyor system to transport the article(s) 22c from the third storage places 13c to the loading station 3 and a storage conveyor system to transport the article(s) 22c from the loading station 3 to the third storage places 13c. In the present example, the storage and retrieval conveyor system in the first storage area 9a is formed by the storage and retrieval devices 19a and 19b, the storage and retrieval conveyor system in the third storage area 9c is formed by the storage and retrieval device 19c.

The transport overhead conveyors 14b and 14d can also be used both for storing and retrieving articles 22b, 22d. Accordingly, the second article transport system 14b also comprises a retrieval conveyor system to transport the article(s) 22b from the second storage places 13b to the loading station 3 and a storage conveyor system to transport the article(s) 22b from the loading station 3 to the second storage places 13b. In addition to this, the third article transport system 14d comprises a retrieval conveyor system to transport the article(s) 22d from the third storage places 13c 'to the loading station 3 and a storage conveyor system to transport the article(s) 22d from the loading station 3 to the third storage places 13c'.

As can be seen from the Figures, the article transport system 14a ... 14f is arranged not only within a storage area 9a ... 9c but reaches beyond the actual storage area 9a. This means that the first article transport system 14a reaches beyond the first storage area 9a, the second article transport system 14b reaches beyond the second storage area 9b and the third article transport system 14c ... 14f reaches beyond the third storage area 9c.

When a picking order is to be processed by the control system 8, the articles 22a ... 22e assigned to the order are retrieved from the article storage 2. If the article(s) 22a assigned to the order are stored in the first storage area 9a, the first loading aids 23, which contain the respective articles 22a, are consequently retrieved from at least one storage rack 18a with the aid of at least one storage and retrieval devices 19a and 19b and transferred to a conveying device of the first article transport system 14a. Then, the article(s) 22a assigned to the order are transported to the first robot 20a by means of the first loading aid 23 and are supplied at the first loading supply position 27a. Then, the article(s) 22a assigned to the order are transferred into a transport means 28a supplied at the second loading supply position 27b by the first robot 20a and are conveyed to the sorting unit 4.

If the article(s) 22b assigned to the order are stored in the second storage area 9b, the second loading aids 24, on or in which the relevant article(s) 22b are stored, are transported to the second robot 20b by means of the second article transport system 14b and supplied at the third loading supply position 27c. Then, the article(s) 22b assigned to the order are transferred into a transport means 28b supplied at the fourth loading supply position 27d by the second robot 20b and are also conveyed to the sorting unit 4.

If the article(s) 22c, 22d assigned to the order are stored in the third storage area 9c, the third loading aids 25a ... 25c are conveyed to the loading station 3.

If the article(s) 22c assigned to the order are stored in the storage rack 18b, the third loading aids 25a, which contain the relevant article(s) 22c, are retrieved from at least one storage rack 18b with the aid of the storage and retrieval device 19c and are transferred to the first section 14c of the third article transport system. Then, the article(s) 22c assigned to the order are transported to the first robot 20a by means of the third loading aid 25a and are supplied at the first loading supply position 27a. Then, the article(s) 22c assigned to the order are transferred into a transport means 28a supplied at the second loading supply position 27b by the first robot 20a and are conveyed to the sorting unit 4.

If the article(s) 22d assigned to the order are stored in the storage overhead tracks 21b, the third aids 25b, 25c, on or in which the relevant article(s) 22d are stored, are transported to the second robot 20b by means of the second section 14c and are supplied at the fifth loading supply position 27e. Then, the article(s) 22d assigned to the order are transferred into a transport means 28b supplied at the fourth loading supply position 27d by the second robot 20b and are also conveyed to the sorting unit 4.

The loading station 3 in FIG. 2 thus comprises a first loading device 10a and a second loading device 10b. The first loading device 10a comprises the first robot 20a as well as the first loading supply position 27a and the second loading supply position 27a. The second loading device 10b comprises the second robot 20b as well as the third to fifth loading supply position 27c ... 27e.

In the storage and order-picking system 1a, 1b, multiple picking orders are processed simultaneously. Retrieving the articles 22a ... 22e provided in the article storage 2 from the article storage 2 takes place individually and independently of other picking orders for each picking order and takes place essentially "without any delay". Retrieving comprises transporting an article 22a out of the article storage 2 according to a first picking order to the loading station 3 and transporting an article 22b out of the article storage 2 according to a second picking order to the loading station 3.

Then, the article(s) 22a according to the first picking order and the article(s) 22b according to the second picking order are provided at the loading station 3. Further, the transport means 28a, 28b of the overhead conveyor system 7a ... 7f are provided at the loading station 3. In a further step, the article(s) 22a for the first picking order is/are transferred into one of the provided transport means 28a of the overhead conveyor system 7a ... 7f, and the article(s) 22b for the second picking order is/are transferred into one (another one) of the transport means 28b of the overhead conveyor system 7a ... 7f. Preferably, in each case, only one article 22a, 22b is loaded into one transport means 28a, 28b.

Subsequently, for each picking order, the transport means 28a, 28b are conveyed via the overhead conveyor system 7a ... 7f from the loading station 3 into the sorting unit 4 individually and independently of the other picking orders and directly, i.e. without further intermediate buffering, essentially "without any delay". In the sorting unit 4, the transport means 28a, 28b are sorted according to the picking orders. Subsequently, the transport means 28a, 28b grouped according to the picking orders are conveyed from the sorting unit 4 to the packing station 5.

At the packing station 5, the sorted transport means 28a, 28b are supplied at the first packing supply position 29a and at the second packing supply position 29b and are transferred into a shipping loading aid 30 supplied by the third robot 20c at the third packing supply position 9c. The packing station 5 in FIG. 2 thus comprises the third robot 20c as well as the first to third packing supply positions 29a ... 29c.

Lastly, the shipping loading aids 30 loaded with the articles 22e are transported to an article transfer zone 31 with the aid of the shipping facility 6 and are for example loaded into a truck and transported away. A shipping loading aid 30 can for example be loaded with lying articles only or with hanging articles only or with a combination of lying and hanging articles.

Empty or still partly filled transport means 28a, 28b can be conveyed from the packing station 5 back to the loading station 3 via the return conveying track 15. It would also be conceivable that empty or still partly filled third loading aids 25a . . . 25c are conveyed from the packing station 5 back into the third storage area 9c (not explicitly shown in the figures).

According to the suggested method, retrieving articles 22a . . . 22e from the article storage 2 takes place individually and independently of other picking orders for each picking order.

This means that a transport of an article 22a out of the first storage area 9a to the loading station 3 and providing the article(s) 22a at the loading station 3 according to a first picking order takes place individually and independently of the transport of an article 22b out of the second storage area 9b to the loading station 3 and providing the article(s) 22b at the loading station 3 according to a second picking order and vice versa.

Likewise, for each picking order, transporting the transport means 28a, 28b from the loading station 3 into the sorting unit 4 via the overhead conveyor system 7a . . . 7f takes place individually and independently of the other picking orders and directly.

This means that a transport of a transport means 28a from the loading station 3 into the sorting unit 4 according to a first picking order takes place individually and independently of the transport of a transport means 28b from the loading station 3 into the sorting unit 4 according to a second picking order and vice versa.

The transport of a transport means 28a, 28b from the loading station 3 into the sorting unit 4 is in each case carried out directly, i.e. in particular without intermediate buffering in a buffer arranged between the loading station 3 and the sorting unit 4 and in particular without a substantial stopping time between the loading station 3 and the sorting unit 4.

If a third picking order exists, these articles 22c, 22d are also retrieved individually and independently of the other picking orders. In concrete terms, this means that a transport of an article 22c, 22d out of the third storage area 9c to the loading station 3 and providing the article(s) 22c, 22d at the loading station 3 according to the third picking order takes place individually and independently of the transport of an article 22a out of the first storage area 9a to the loading station 3 and providing the article 22a at the loading station 3 according to the first picking order and also individually and independently of the transport of an article 22b out of the second storage area 9b to the loading station 3 and providing the article 22b at the loading station 3 according to the second picking order.

The transport of a transport means 28a, 28b from the loading station 3 into the sorting unit 4 for the third picking order is also carried out directly, i.e. in particular without intermediate buffering in a buffer arranged between the loading station 3 and the sorting unit 4 and in particular without a substantial stopping time between the loading station 3 and the sorting unit 4.

It would also be conceivable that for the third picking order, the transport means 28a, 28b are conveyed from the loading station 3 directly to the packing station 5 via the overhead conveyor system 7a . . . 7f, bypassing the sorting unit 4 (see the bypass overhead conveyor system 7f in FIG. 1). Sorting the articles 22c, 22d is omitted in this variant, whereby the processing time of an order and/or run-through time of an article 22c, 22d through the storage and order-picking system 1a, 1b is shortened even further.

In the storage and order-picking system 1a, 1b shown in the figures, the loading station 3 comprises a first loading device 10a and a second loading device 10b. Accordingly, the articles 22a are transported from the first storage area 9a to the first loading device 10a and the articles 22b are transported from the second storage area 9b to the second loading device 10b. The articles 22c, 22d of the third storage area 9c are transported either to the loading device 10a or to the second loading device 10b. In concrete terms, the articles 22c, which are stored in the storage rack 18b, are transported to the first loading device 10a and articles 22d, which are stored in the storage overhead conveyors 21b, are transported to the second loading device 10b.

As regards the third loading aids 25a . . . 25c of the third storage area 9c, furthermore, different approaches are conceivable. For example, a third loading aid 25b, 25c can be formed by a hanging bag having a suspended support for transport by the third article transport system 14c . . . 14f and a storage space 26 for holding the articles 22d. Hence, in particular lying articles can be stored in the third loading aid 25b, 25c. However, it would also be conceivable that a third loading aid 25b, 25c is formed by a hanging bag having a suspended support for transport by the third article transport system 14c . . . 14f and a storage space 26 for holding the articles 22d and a transport hook for hanging the article(s) 22d. Hence, in particular hanging articles can be stored in the third loading aid 25b, 25c. Lastly, it would also be possible that a third loading aid 25a . . . 25c is formed by a suspension adapter for suspending the article(s) 22d. Hence, hanging articles can also be stored in the third storage area 9c without the aid of a hanging bag.

If the third loading aids 25a . . . 25c are configured for the transport by the overhead conveyor system 7a . . . 7f, these can be conveyed directly to the sorting unit 4 bypassing the loading station 3 (see the third section 14e of the third article transport system opening into the second section 7b of the overhead conveyor system in FIG. 1) or directly to the packing station 5 (see the fourth section 14f of the third article transport system opening into the sixth section 7f of the overhead conveyor system in FIG. 1). This is in particular possible if the third loading aids 25a . . . 25c are designed as hanging bags or as suspension adapters.

The second section 7b of the overhead conveyor system and the third section 14e of the third article transport system can be constructed with the same conveyor technology and thus be regarded as one (single) transport system. Likewise, the fifth section 7f of the overhead conveyor system and the fourth section 14f of the third article transport system can be constructed with the same conveyor technology and thus be regarded as one (single) transport system. Accordingly, the third storage area 9c can be directly connected to the sorting unit 4 or to the packing station 5 via the overhead conveyor system or the article transport system 14.

In the storage and order-picking system 1b shown in FIG. 2, no third and fourth sections 14e, 14f of the third article transport system are shown. Nevertheless, there, the application of a third and fourth section 14e, 14f of the third article transport system is possible as well without any restrictions.

Moreover, no return conveying track 15 from the packing station 5 back to the loading station 3 and no conveying track from the packing station 5 back into the storage area 9c is explicitly shown in FIG. 2. Nevertheless, the application of a return conveying track 15 from the packing station 5 back to the loading station 3 and a conveying track from the packing station 5 back into the storage area 9c is also possible without any restrictions in the storage and order-picking system 1b shown in FIG. 2.

In the sorting unit 4, the transport means 28a, 28b are sorted according to the picking orders. For this purpose, the sorting unit 4 can in particular comprise a first sorting stage 11a and a following second sorting stage 11b, as is shown in FIGS. 1 and 2. In this regard, the second sorting stage 11b is in particular designed for sorting the transport means 28a, 28b for one of the first and second picking orders according to a predefined order.

Preferably, sorting of the transport means 28a, 28b is carried out according to an order of the articles 22a . . . 22e within the respective picking order. This means that the transport means 28a of the first picking order then arrive at the packing station 5 sorted in an order. The same applies to the transport means 28b of the second picking order and the transport means 28a, 28b of the third picking order.

A first sorting stage 11a, 11b may have one sorting lane or multiple sorting lanes. In particular, the first sorting stage 11b is designed to buffer the transport means 28a, 28b of a single first picking order or single second picking order per sorting lane.

Before retrieving the articles 22a . . . 22e, additionally, an analysis of the article(s) 22a . . . 22e stored in the first storage area 9a, in the second storage area 9b and in the third storage area 9c and a determination of the article(s) 22a . . . 22e required for one of the picking orders may take place. In a first variant, the article(s) 22c, 22d is/are retrieved from the third storage area 9c if it was determined in the analysis that the required article(s) 22a . . . 22e is/are stored both in one of the first and second storage areas 9a, 9b and in the third storage area 9c. This means that a stock of articles in the third storage area 9c is drawn on, whereby the same can be designed to be relatively small.

However, it would also be conceivable that the article(s) 22a . . . 22e is/are retrieved from one of the first and second storage areas 9a, 9c if it was determined in the analysis that the required article(s) 22a . . . 22e is/are stored both in one of the first and second storage areas 9a, 9b and in the third storage area 9c. This means that in this case, a stock of articles in the first storage area 9a and/or the second storage area 9b is drawn on, whereby the same can be designed to be relatively small.

Advantageously, the first storage area 9a and the second storage area 9b are designed as article supply stores and the third storage area 9c is designed as a return articles store. The fourth storage area 9d is in particular designed as a pallet storage, which interacts with the first storage area 9a. However, these are no obligatory conditions for the suggested method and the storage areas 9a . . . 9d can also have another function. It is also possible that merely the first storage area 9a (in particular as an article supply store) and the second storage area 9b (in particular as a return articles store) are provided.

In order to keep the load on the overhead conveyor system 7a . . . 7f low, at least one of the transport means 28a, 28b is loaded with more than one article 22a . . . 22e of a picking order. If articles 22a . . . 22d are still contained in a loading aid 23 . . . 25c after transferring the article(s) 22a . . . 22d into a transport means 28a, 28b, these are preferably transported back into the article storage 2 (see return conveying track 15). Hence, the remaining articles 22a . . . 22d are available for a subsequent picking order.

Lastly, it is advantageous if the transport means 28a, 28b has a characterizing feature and a characterizing feature of the article(s) 22a . . . 22e is detected by the control system 8, wherein after transferring the article(s) 22a . . . 22e into the transport means 28a, 28b, a detection means automatically detects the characterizing feature of the transport means 28a, 28b and the article(s) 22a . . . 22e is/are data-technically linked to the associated transport means 28a, 28b by the control system 8. In particular, it is advantageous in this regard if each transport means 28a, 28b has a characterizing feature, which is readable in a contactless manner, with an unambiguous identifying information, in particular a characterizing feature which is readable optically or by radio. Thus, an article 22a . . . 22e can be easily located within the storage and order-picking system 1a, 1b, and the picking operation (in concrete terms loading of a shipping loading aid 30) can be carried out in an easy manner. For example, the characterizing feature can be formed of data which is stored on an RFID tag ("Radio Frequency Identification tag") of the transport means 28a, 28b or which is applied to the transport means 28a, 28b in the form of a one-dimensional or two-dimensional barcode.

The method described with respect to FIGS. 1 and 2 is assumed by the control system 8. This means that the control system 8 controls the indicated devices to perform the described method, as is adumbrated in FIGS. 1 and 2 with arrows pointing away from control system 8. It would also be conceivable that parts of the described method are assumed by other, superordinate or subordinate controls. For example, parts of the method can be assumed by controllers of the robots 19a . . . 19c, of the overhead conveyor system 7a . . . 7f or of the article transport system 14 . . . 14f. The control system 8 may in particular comprise a computer with a program running thereon and be formed at least partly by a programmable logic controller.

Finally, it should be noted that the scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

In particular, it should also be noted that the devices shown may in reality comprise more or fewer components than those shown. In some cases, the shown devices and/or their components may not be depicted to scale and/or be enlarged and/or reduced in size.

LIST OF REFERENCE NUMBERS 1a, 1b storage and order-picking system
2 article storage
3 loading station
4 sorting unit
5 packing station
6 shipping facility
7a . . . 7f overhead conveyor system
8 control system
9a . . . 9d storage area
10a . . . 10b loading device
11a . . . 11b sorting stage
12a . . . 12b packing device
13 . . . 13c' storage place
14 . . . 14f article transport system
15 return conveying track
16 building
17a . . . 17c article acceptance zone
18a, 18b storage rack
19a . . . 19c storage and retrieval device
20a . . . 20c robot
21a, 21b storage overhead conveyors
22a . . . 22e article(s)
23 first loading aid
24 second loading aid (clothes hanger)
25a . . . 25c third loading aid
26 retention space 27a ... 27e loading supply position
28a, 28b transport means (hanging bag)
29a ... 29c packing supply position
30 shipping loading aid
31 article transfer zone

The invention claimed is:

1. A method for picking articles (22a ... 22e) in a storage and order-picking system (1a, 1b) with
an article storage (2),
a loading station (3),
a sorting unit (4),
a packing station (5),
an overhead conveyor system (7a ... 7f) with transport means (28a, 28b) for accommodating articles (22a ... 22e) and for transporting the articles (22a ... 22e) in the transport means (28a, 28b) between the loading station (3), the sorting unit (4) and the packing station (5),
and a control system (8),
comprising the steps:
providing articles (22a ... 22e) in the article storage (2), wherein the articles (22a ... 22e) comprise lying articles and/or hanging articles,
acquiring picking orders by the control system (8),
retrieving articles (22a ... 22e) from the article storage (2) individually and independently of other picking orders for each picking order, wherein retrieving comprises
transporting an article (22a) out of the article storage (2) according to a first picking order to the loading station (3), and
transporting an article (22b) out of the article storage (2) according to a second picking order to the loading station (3),
providing the article(s) (22a) according to the first picking order and the article(s) (22b) according to the second picking order in each case at the loading station (3),
providing transport means (28a, 28b) of the overhead conveyor system (7a ... 7f) at the loading station (3),
transferring the article(s) (22a) for the first picking order into one of the transport means (28a, 28b) of the overhead conveyor system (7a ... 7f) and the article(s) (22b) for the second picking order into one of the transport means (28a, 28b) of the overhead conveyor system (7a ... 7f),
for each picking order, transporting the transport means (28a, 28b) from the loading station (3) directly into the sorting unit (4) via the overhead conveyor system (7a, 7b) individually and independently of the other picking orders, and
sorting the transport means (28a, 28b) in the sorting unit (4) according to the picking orders, and
transporting the transport means (28a, 28b) grouped according to the picking orders from the sorting unit (4) to the packing station (5).

2. The method according to claim 1,
comprising the steps
retrieving articles (22a ... 22e) from the article storage (2) individually and independently of other picking orders for each picking order, wherein retrieving comprises
transporting an article (22c, 22d) out of the article storage (2) according to a third picking order to the loading station (3),
providing the article(s) (22c, 22d) according to the third picking order at the loading station (3),
providing a transport means (28a, 28b) of the overhead conveyor system (7a ... 7f) at the loading station (3),
transferring the article(s) (22c, 22d) for the third picking order into the transport means (28a, 28b) of the overhead conveyor system (7a ... 7f), and
transporting the transport means (28a, 28b) via the overhead conveyor system (7f) from the loading station (3) directly to the packing station (5).

3. The method according to claim 1, wherein the article storage (2) comprises a first storage area (9a) with
first storage places (13a) and
a first article transport system (14a) operated in an automated manner for transporting the articles (22a) between the first storage places (13a) and the loading station (3),
wherein the articles (22a), when retrieved from the first storage area (9a), are taken over from the first storage places (13a) by the first article transport system (14a) and are transported by the first article transport system (14a) to the loading station (3).

4. The method according to claim 3, wherein the lying articles are stored in the first storage area (9a) with first loading aids (23).

5. The method according to claim 1, wherein the article storage (2) comprises a second storage area (9b) with
second storage places (13b) and
a second article transport system (14b) operated in an automated manner for transporting the articles (22b) between the second storage places (13b) and the loading station (3),
wherein the articles (22b), when retrieved from the second storage area (9b), are taken over from the second storage places (13b) by the second article transport system (14b) and are transported by the second article transport system (14b) to the loading station (3).

6. The method according to claim 5, wherein the hanging articles in the second storage area (9b) are stored with second loading aids (24).

7. The method according to claim 1, wherein the article storage (2) comprises a third storage area (9c) with
third storage places (13c, 13c') and
a third article transport system (14c, 14d) for transporting the articles (22c, 22d) between the third storage places (13c, 13c') and the loading station (3), wherein the articles (22c, 22d), when retrieved from the third storage area (9c), are taken over from the third storage places (13c, 13c') by the third article transport system (14c, 14d) and are transported from the third second article transport system (14c, 14d) to the loading station (3).

8. The method according to claim 7, wherein the lying articles and hanging articles in the third storage area (9c) are stored with third loading aids (25a ... 25c).

9. The method according to claim 3, wherein the loading station (3) comprises a first loading device (10a) and a second loading device (10b), wherein
the articles (22a), when retrieved from the first storage area (9a), are taken over from the first storage places (13a) by the first article transport system (14a) and are transported by the first article transport system (14a) to the first loading device (10a), and
the articles (22b), when retrieved from the second storage area (9b), are taken over from the second storage places (13b) by the second article transport system (14b) and are transported from the second article transport system (14b) to the second loading device (10b).

10. The method according claim 3, wherein the loading station (3) comprises a first loading device (10a) and a second loading device (10b), wherein the articles (22c, 22d), when retrieved from the third storage area (9c), are taken over from the third storage places (13c, 13c') by the third article transport system (14c, 14d) and are transported by the third article transport system (14c, 14d) either to the first loading device (10a) or to the second loading device (10b).

11. The method according to claim 2, wherein the hanging article(s) is/are transported by the overhead conveyor system (7a . . . 7f) out of a third storage area (9c) to the sorting unit (4) or packing station (5).

12. The method according to claim 1, wherein the article storage (2) comprises a third storage area (9c) with
   third storage places (13c, 13c') and
   a third article transport system (14e, 14f) for transporting the articles (22c, 22d) between the third storage places (13c, 13c') and the overhead conveyor system (7a . . . 7f), wherein
   the articles (22c, 22d) in the third storage area (9c) comprise hanging articles, which are stored with the third loading aid (25a . . . 25c), and
   the hanging articles, when retrieved from the third storage area (9c), are taken over from the third storage places (13c, 13c') by the third article transport system (14e, 14f) and are transferred by the third article transport system (14e, 14f) to the overhead conveyor system (7a . . . 7f).

13. The method according to claim 2, wherein the third loading aid (25a . . . 25c) of the third storage area (9c)
   comprises a hanging bag with a suspended support for the transport by the third article transport system (14c . . . 14f) and a storage space (26) for receiving the article(s) (22c, 22d), and/or
   comprises a hanging bag with a suspended support for the transport by the third article transport system (14c . . . 14f) and with a storage space (26) for receiving the article(s) (22c, 22d) and a transport hook for suspending the article(s) (22c, 22d), and/or
   is formed by a suspension adapter for suspending the article(s) (22c, 22d).

14. The method according to claim 2, wherein at least one of the first and second storage areas (9a, 9b) is an article supply store, and the third storage area (9c) is a return article storage.

15. The method according to claim 2, comprising the additional step
   analysis of the article(s) (22a . . . 22e) stored in the article storage (2) in one of the first and second storage areas (9a, 9b) and the third storage area (9c) by means of the control system (8),
   determining the article(s) (22a . . . 22e) required for one of the picking orders,
   retrieving articles (22c, 22d) from the third storage area (9c), if it was determined in the analysis that the required article(s) (22a . . . 22e) is/are stored both in one of the first and second storage areas (9a, 9b) and in the third storage area (9c).

16. The method according to claim 2, comprising the additional step
   analysis of the article(s) (22a . . . 22e) stored in the article storage (2) in one of the first and second storage areas (9a, 9b) and the third storage area (9c) by means of the control system (8),
   determining the article(s) (22a . . . 22e) required for one of the picking orders,
   retrieving articles (22a, 22b) from one of the first and second storage areas (9a, 9c), if it was determined in the analysis that the required article(s) (22a . . . 22e) is/are stored both in one of the first and second storage areas (9a, 9b) and in the third storage area (9c).

17. The method according to claim 1, wherein the first and/or second loading aid (23, 24) is transported back into the article storage (2) after transferring the article(s) (22a . . . 22e) for one of the first and second picking orders, if the first and/or second loading aid (23, 24) still contains article(s) (22a . . . 22e).

18. The method according to claim 1, wherein the transport means (28a, 28b) has a characterizing feature and a characterizing feature of the article(s) (22a . . . 22e) is detected by the control system (8), wherein after transferring the article(s) (22a . . . 22e) into the transport means (28a, 28b), a detection means automatically detects the characterizing feature of the transport means (28a, 28b) and the article(s) (22a . . . 22e) is/are data-technically linked to the associated transport means (28a, 28b) by the control system (8).

19. The method according to claim 1, wherein at least one of the transport means (28a, 28b) is loaded with more than one article (22a, 22b) for one of the first and second picking orders.

20. The method according to claim 1, wherein sorting the transport means (28a, 28b) in the sorting unit (4) comprises sorting the transport means (28a, 28b) according to an order of the articles (22a . . . 22e) within the respective picking order.

21. The method according to claim 1, wherein the articles (22a . . . 22e) are removed from the transport means (28a, 28b) and transferred into shipping loading aids (30) at the packing station (5).

22. The method according to claim 1, wherein after transferring the one or multiple article(s) (22a . . . 22e) for one of the first, second and third picking orders from the one or multiple transport means (28a, 28b) into the at least one shipping loading aid (30), the at least one shipping loading aid (30) is transported to a shipping facility (6).

23. A storage and order-picking system (1a, 1b) for picking articles, in particular for performing the method according to claim 1, comprising
   an article storage (2) for providing articles (22a . . . 22e), wherein the articles (22a . . . 22e) comprise lying articles and/or hanging articles, and wherein the article storage (2) comprises
      storage places (13) and
      an article transport system (14) for transporting the articles (22a . . . 22e) between the storage places (13) and the loading station (3), and
   a loading station (3) for transferring the articles (22a . . . 22e) into transport means (28a, 28b) according to picking orders,
   a sorting unit (4) for sorting the transport means (28a, 28b),
   a packing station (5) for transferring the articles (22a . . . 22e) out of the transport means (28a, 28b) into shipping loading aids (30) according to picking orders,
   an overhead conveyor system (7a . . . 7f) with transport means (28a, 28b) for accommodating articles (22a . . . 22e) and for transporting the articles (22a . . . 22e) in the transport means (28a, 28b) between the loading station (3), the sorting unit (4) and the packing station (5), and a control system (8), which is
- data-technically connected to the article storage (2), the loading station (3), the sorting unit (4), the overhead conveyor system (7a . . . 7f) and the packing station (5),
- configured to acquire picking orders, and
  - configured to control the article transport system (14) for retrieving the articles (22a . . . 22e) from the article storage (2), wherein retrieving comprises:
    - transporting an article (22a) out of the article storage (2) according to a first picking order to the loading station (3), and
    - transporting an article (22b) out of the article storage (2) according to a second picking order to the loading station (3),
  - wherein
  - the control system (8) is further configured to
    - control the article transport system (14) for retrieving the articles (22a . . . 22e) out of the article storage (2) individually and independently of other picking orders for each picking order, and
    - control the overhead conveyor system (7a, 7b) for directly transporting the transport means (28a, 28b) from the loading station (3) into the sorting unit (4) individually and independently of other picking orders for each picking order.

24. The storage and order-picking system (1a, 1b) according to claim 23, wherein
in a first storage area (9a), the article storage (2) comprises first storage places (13a) of the storage places (13) and a first article transport system (14a) of the article transport system (14) operated in an automated manner for transporting the articles (22a) between the first storage places (13a) and the loading station (3), and
the control system (8) is configured to control the first article transport system (14a), during the retrieval of the articles (22a) from the first storage area (9a), to take over the articles (22a) from the first storage places (13a) and to transport the articles (22a) to the loading station (3).

25. The storage and order-picking system (1a, 1b) according to claim 23, wherein
in a second storage area (9b), the article storage (2) comprises second storage places (13b) of the storage places (13) and a second article transport system (14b) of the article transport system (14) operated in an automated manner for transporting the articles (22b) between the second storage places (13b) and the loading station (3), and
the control system (8) is configured to control the second article transport system (14b), during the retrieval of the articles (22b) from the second storage area (9b), to take over the articles (22b) from the second storage places (13b) and to transport the articles (22b) to the loading station (3).

26. The storage and order-picking system (1a, 1b) according to claim 23, wherein, in a third storage area (9c), the article storage (2) comprises third storage places (13c, 13c') of the storage places (13) and a third article transport system (14c, 14d) of the article transport system (14) for transporting the articles (22c, 22d) between the third storage places (13c, 13c') and the loading station (3), and
the control system (8) is configured to control the third article transport system (14c, 14d), during the retrieval of the articles (22c, 22d) from the third storage area (9c), to take over the articles (22c, 22d) from the third storage places (13c, 13c') and to transport the articles (22c, 22d) to the loading station (3).

27. The storage and order-picking system (1a, 1b) according to claim 23, wherein the control system (8) is configured to control the overhead conveyor system (7a . . . 7f) to transport the hanging article(s) out of a third storage area (9c) to the sorting unit (4) or to the packaging unit (5).

28. The storage and order-picking system (1a, 1b) according to claim 23, wherein
in a third storage area (9c), the article storage (2) comprises third storage places (13c, 13c') of the storage places (13) and a third article transport system (14e, 14f) of the article transport system (14) for transporting the articles (22c, 22d) between the third storage places (13c, 13c') and the overhead conveyor system (7a . . . 7f), and
the articles (22c, 22d) in the third storage area (9c) comprise hanging articles, which are stored with a third loading aid (25), and
the control system (8) is configured to control the third article transport system (14e, 14f), during the retrieval of the articles (22c, 22d) from the third storage area (9c), to take over the articles (22c, 22d) from the third storage places (13c, 13c') and to transfer the articles (22c, 22d) to the overhead conveyor system (7a . . . 7f).

29. The storage and order-picking system (1a, 1b) according to claim 26, wherein the third loading aid (25a . . . 25c) of the third storage area (9c)
comprises a hanging bag with a suspended support for the transport by the third article transport system (14c . . . 14f) and a storage space (26) for receiving the article(s) (22c, 22d), and/or
comprises a hanging bag with a suspended support for the transport by the third article transport system (14c . . . 14f) and with a storage space (26) for receiving the article(s) (22c, 22d) and a transport hook for suspending the article(s) (22c, 22d), and/or
formed by a suspension adapter for suspending the article(s) (22c, 22d).

30. The storage and order-picking system (1a, 1b) according to claim 23, wherein the loading station (3) comprises a first loading device (10a) and a second loading device (10b), wherein the control system (8) is configured to
control the first article transport system (14a), during the retrieval of the articles (22a) from the first storage area (9a), to take over the articles (22a) from the first storage places (13a) and to transport the articles (22a) to the first loading device (10a), and
control the second article transport system (14b), during the retrieval of the articles (22b) from the second storage area (9b), to take over the articles (22b) from the second storage places (13b) and to transport the articles (22b) to the second loading device (10b).

31. The storage and order-picking system (1a, 1b) according to claim 23, wherein the loading station (3) comprises a first loading device (10a) and a second loading device (10b), wherein the control system (8) is configured to control the third article transport system (14c, 14d), during the retrieval of the articles (22c, 22d) from the third storage area (9c), to take over the articles (22c, 22d) from the third storage places (13c, 13c') and to optionally transport the articles (22c, 22d) to the first loading device (10a) or to the second loading device (10b).

32. The storage and order-picking system (1a, 1b) according to claim 23, wherein at least one of the first and second storage areas (9a, 9b) is configured as an article supply store, and the third storage area (9c) as a return article storage (2).

33. The storage and order-picking system (1a, 1b) according to claim 23, wherein the first article transport system (14a) is formed by a retrieval conveyor system to transport the articles (22a) from the first storage places (13a) to the loading station (3) and a storage conveyor system to transport the articles (22a) from the loading station (3) to the first storage places (13a).

34. The storage and order-picking system (1a, 1b) according to claim 23, wherein the second article transport system (14b) is formed by a retrieval conveyor system to transport the articles (22b) from the second storage places (13b) to the loading station (3) and a storage conveyor system to transport the articles (22b) from the loading station (3) to the second storage places (13b).

35. The storage and order-picking system (1a, 1b) according to claim 23, wherein each transport means (28a, 28b) has a characterizing feature, which is readable in a contactless manner, with an unambiguous identifying information, in particular a characterizing feature which is readable optically or by radio.

36. The storage and order-picking system (1a, 1b) according to claim 23, wherein the sorting unit (4) has a first sorting stage (11a) and the first sorting stage (11a) has one or multiple sorting lanes, wherein the first sorting stage (11a) is designed to buffer the transport means (28a, 28b) of a single first picking order or single second picking order per sorting lane.

37. The storage and order-picking system (1a, 1b) according to claim 23, wherein the sorting unit (4) has a first sorting stage (11a) and at least one subsequent second sorting stage (11b), wherein the second sorting stage (11b) is designed for sorting the transport means (28a, 28b) for one of the first and second picking orders according to a predefined order.

* * * * *